United States Patent [19]

Zacharin

[11] 4,215,836
[45] Aug. 5, 1980

[54] INFLATABLE DECELERATOR

[75] Inventor: Alexey T. Zacharin, Parsippany, N.J.

[73] Assignee: The United States of America as represented by the Secretary of the Army, Washington, D.C.

[21] Appl. No.: 956,013

[22] Filed: Oct. 30, 1978

[51] Int. Cl.² ............................................. B64D 19/00
[52] U.S. Cl. ................................... 244/138 R; 102/35;
102/37.1; 102/4; 244/3.27; 244/113
[58] Field of Search ............... 244/113, 138 R, 138 A,
244/142, 145, 146, 147, 160, 3.27, 3.3; 102/2–4,
35, 35.6, 35.4, 37.1, 34.1, 88

[56] References Cited

U.S. PATENT DOCUMENTS

| 1,342,221 | 6/1920 | McDonald | 244/138 R |
| 3,390,853 | 7/1968 | Wykes | 244/113 |
| 3,550,885 | 12/1970 | Crabtree | 244/138 R |
| 3,972,495 | 8/1976 | Jalbert | 244/145 |
| 4,005,655 | 2/1977 | Kleinschmidt | 102/4 |

FOREIGN PATENT DOCUMENTS

| 1580809 | 9/1969 | France | 244/138 R |
| 473958 | 10/1937 | United Kingdom | 102/4 |

Primary Examiner—Galen L. Barefoot
Attorney, Agent, or Firm—Nathan Edelberg; Robert P. Gibson; Harold H. Card, Jr.

[57] ABSTRACT

The present invention relates to a speed retarding mechanism for aerial bombs launched from a high velocity vehicle and designed to provide a high drag stabilizer capable to withstand release in air stream velocities moving at 2600 feet per second. The mechanism includes a balloon consisting of a top and bottom panel joined on the perimeters and having valve openings through its bottom panel. When the load has been braked to an acceptable velocity the valve closes the openings causing the balloon to collapse and become a streamer providing a high energy impact.

6 Claims, 4 Drawing Figures

INFLATABLE DECELERATOR

GOVERNMENTAL INTEREST

The invention described herein may be manufactured, used, and licensed by or for the United States Government for governmental purposes without payment to me of any royalty thereon.

BACKGROUND OF THE INVENTION

When a retarding mechanism and a body suspended therefrom are launched from an aircraft or missile, the high speed at the time of dispersal causes a severe shock to the package due to sudden retardation. The sudden shock is frequently sufficient to cause general mechanical failure to the retarding device or damage to the load which increases the incidence of duds. The prior art retarding devices utilized parachutes, metal fin stabilizers and ballute technology to retard the impact upon dispersal and descent to reduce incidences of damage. A common difficulty with such devices has been that excessive speeds at the time of dispersal often results in mechanical failure. For example, parachutes used individually would provide drag at speeds below 1500 feet per second but at higher speeds the lines would tangle, become disoriented or break. Parachutes also prove disadvantageous in wooded areas since they would be hung up in branches and shrubs preventing the load to penetrate to the target.

Metal fin stabilizers perform satisfactorily where release velocities are under 1600 feet per second but encounter structural failure operating above 2000 feet per second. A combination of a parachute and balloon referred to as ballute technology requires air ports at its extremeties to provide the proper orientation to inflate the ballute. However, none of the present designs available would assure proper operation or structural integrity at speeds above 2000 feet per second.

SUMMARY OF THE INVENTION

The present invention relates to ballute technology which will permit successful dispersion at speeds above 2600 feet per second by providing rigid air scoops which will assure proper inflation of the device and structural integrity. In addition, upon deceleration to a pre-selected terminal velocity the ballute becomes a streamer to allow the munition to impact at a high energy level.

It is, therefore, an object of this invention to provide a novel high drag stabilizer attached to a munition so that a greater reliability of operation is possible than in the prior art.

Another object of this invention is to provide a high drag stabilizer which can be economically constructed and can operate at speeds of 2600 feet per second.

Still another object of this invention is to provide a high drag stabilizer, which is attached to a munition and upon deceleration to a pre-selected terminal velocity becomes a streamer providing a high energy impact.

A further object of this invention is to provide a high drag stabilizer attached to a munition which is affected by means entirely responsive to acceleration and deceleration forces.

These and other objects and many of the attendant advantages of the present invention will become apparent as the same becomes better understood from the following detail description, taken in conjunction with accompanying drawings.

DETAILED DESCRIPTION OF THE INVENTION

Referring now more particularly to the drawings, the number 10 designates the inflatable decelerator of a preferred form and constructed in accordance with the present invention.

Figure 1:
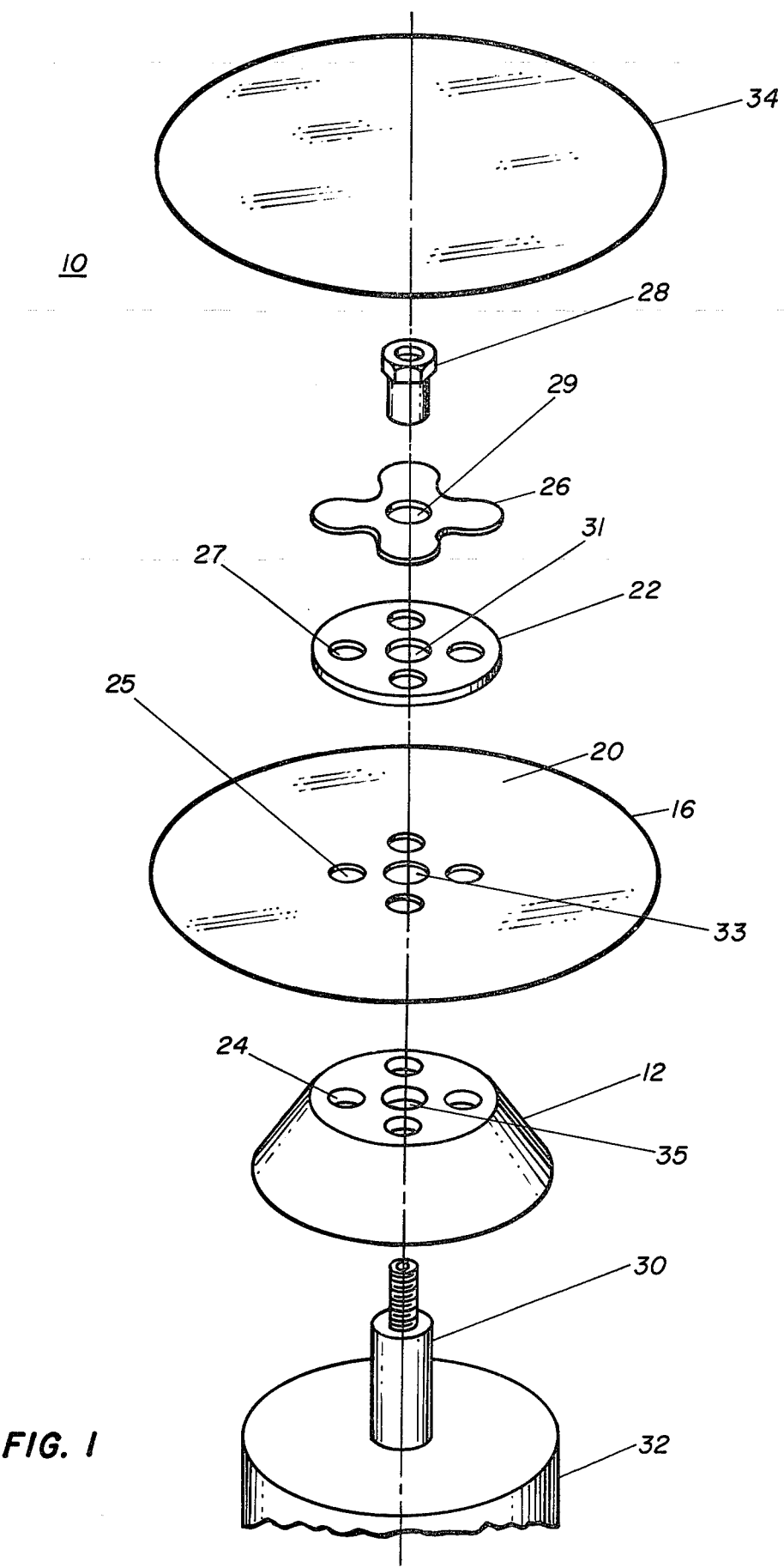
FIG. 1 is an exploded view of the inflatable decelerator.
Figure 2:
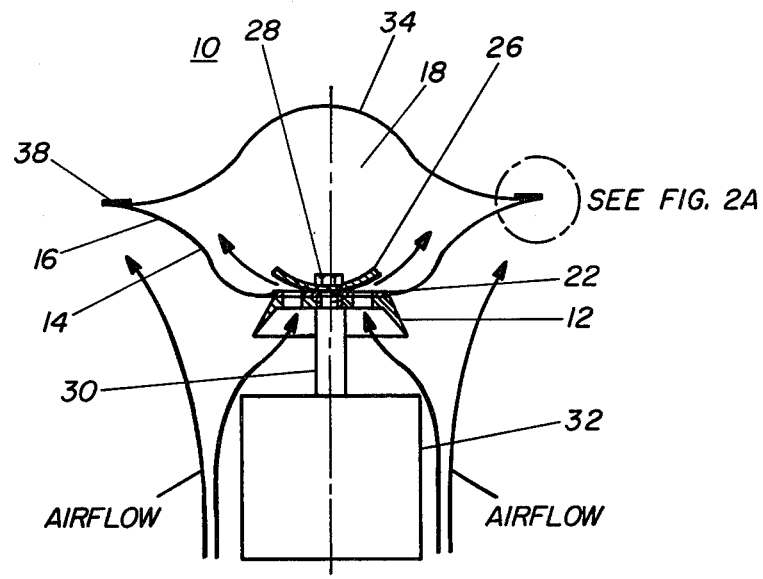
FIG. 2 is a central longitudinal section through an embodiment of the invention showing the arrangement of the device in a fully inflated condition.
Figure 2A:
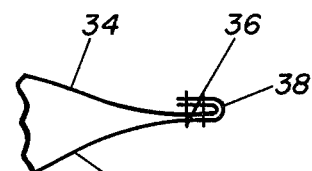
FIG. 2a is a fragmentary view of FIG. 2 showing an enlarged view of the seam.
Figure 3:
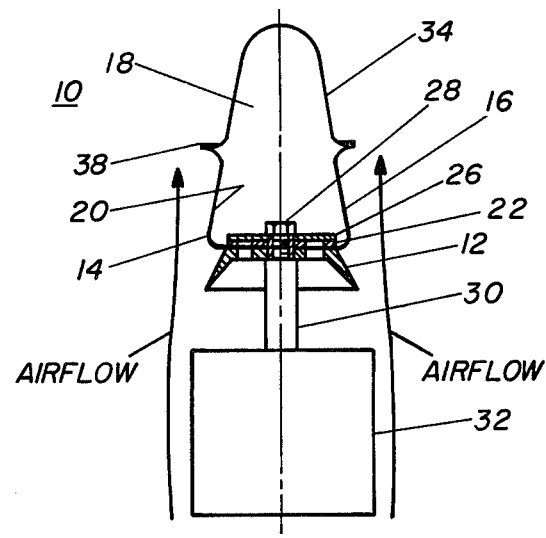
FIG. 3 is a view similar to FIG. 2 but with the inflatable decelerator collapsed forming a streamer prior to impact.

In FIG. 1 of the drawings the inflatable decelerator 10 is shown in an exploded view while FIG. 2 and FIG. 3 show the item in operation. The decelerator 10 includes a rigid air scoop 12 made of plastic or metal cemented to the underside 14 of the bottom panel 16 of the ballute 18. The top side 20 of the bottom panel 16 is in turn cemented to a stiffener 22. The holes 24 of the air scoop 12, 25 of the bottom panel 16 and 27 of the stiffener 22 are in alignment to allow air to pass through and inflate the ballute 18. A valve 26 is placed directly on the stiffener 22 covering the holes 24 and held in place with a flare nut 28. The flare nut 28 passes through a central hole 31 in the stiffener 22, central hole 33 in the bottom panel 16, central hole 35 in the air scoop 12, central hole 29 in the valve 26 and is threadedly attached to a load stem 30, which is in turn secured to the load 32. The entire unit is packaged in the normal way.

In FIG. 2 the top panel 34 is attached to the bottom panel 16 at their folded peripheral edges 38 by the stitches 36 to form a ballute 18. The type of stitch 36 and the materials used can be varied to accommodate the strength required at the seam 38. The top panel 34 and the bottom panel 16 should be made from flexible material such as high strength cloth, like Kevlar, impregnated with a rubberized material to make it air tight.

In operation the parts are in the position as shown in FIG. 2 after the device is dropped into the air stream. Initially, there is an enormous impact on the apparatus as it falls generally in a vertical fashion acquiring great speed. Air flow enters the air scoop 12 forcing the valve 26 open, inflating the ballute 18. The rate at which the ballute becomes inflated may be controlled by varying the size of the holes 24, 25 and 27. When the device has fallen a short distance deceleration takes effect and its descent is gradually reduced until it has slowed to a given speed. When the deceleration has reached a preselected velocity, air flow entering the air scoop 12 is reduced considerably, thus allowing the valve 26 to close. Without sustained air flow, the ballute collapses forming a streamer, (see FIG. 3) providing proper orientation with respect to the desired terminal velocity.

It will be understood that the total assembly comprising mass or load 32 is adapted for dispersal above a target and to fall toward the ground. Ballute 18 is formed by substantially air-impervious wall surfaces or panels 16 and 34 which define the shape of a deformable hollow chamber comprising the ballute. Holes 24, 25 and 27 comprise passage means communicating between the air scoop and the chamber, while valve 26 comprises four resiliently deformable valve closure members adapted to cover passages 27 until they open at a predetermined air pressure and reclose at another such pressure.

While only one basic illustrative example of devices according to the present invention has been specifically described herein, it is obvious that many variations and modifications thereof are possible within the scope of the teachings of this disclosure. It is therefore to be understood that the scope of the invention is not intended to be limited by the specific illustrative example described but rather by the scope and language of the appended claims.

I claim:

1. An inflatable decelerator for deployment with a load into an airstream comprising:
  a ballute including:
    a top panel and bottom panel defining said ballute;
    means for attaching said top panel to said bottom panel;
    air scoop means attached to the underside of said bottom panel containing at least one passage for admitting air into said ballute;
    stiffener means attached to the top side of said bottom panel containing at least one passage for admitting air into said ballute;
    valve means placed on top of said stiffener to monitor the inflow of air;
  means for appending said ballute to said load, whereby, upon release into the air stream air enters said air scoop opening said valve means and inflating said ballute, and upon achieving a predetermined deceleration, said valve means closes, causing said ballute to collapse and become a streamer until said load strikes the target.

2. An inflatable decelerator as claimed in claim 1 wherein said attaching means of said top panel and said bottom panel comprises stitching.

3. An inflatable decelerator as claimed in claim 1 wherein said valve means is a pressure responsive element arranged to respond to a pressure differential of air passing into said ballute.

4. An inflatable decelerator as claimed in claim 1 wherein said air scoop, said bottom panel and said stiffener each contain a plurality of openings aligned to permit the passage of air into said ballute.

5. An inflatable decelerator as claimed in claim 1 wherein the means for appending said ballute to said load is a flare nut that passes through said valve, said stiffener, said bottom panel and said air scoop and is threadedly attached to said load.

6. In an assembly for dispersal above a target;
  a mass adapted to fall through air;
  deformable hollow chamber means having flexible, substantially air-impervious wall surfaces defining the said chamber means;
  airscoop means for collecting air during movement of said mass through air;
  passage means communicating between said chamber means and said air scoop means into said chamber means to inflate and thereby deform said chamber means;
  movable valve means in said passage means for controlling said flow of collected air into said chamber means to vary the shape of said chamber means;
  said movable valve means including at least one resiliently deformable valve closure member adapted to open at a first air pressure valve to inflate said chamber means and to close at a second air pressure valve to collapse said chamber means; and
  attachment means for securing said deformable hollow chamber means to said mass so that said chamber means, upon inflation, upsets air-flow around said mass and retards said movement.

* * * * *